(No Model.) 3 Sheets—Sheet 3.
P. WEBER.
FRICTION CLUTCH.
No. 483,370. Patented Sept. 27, 1892.
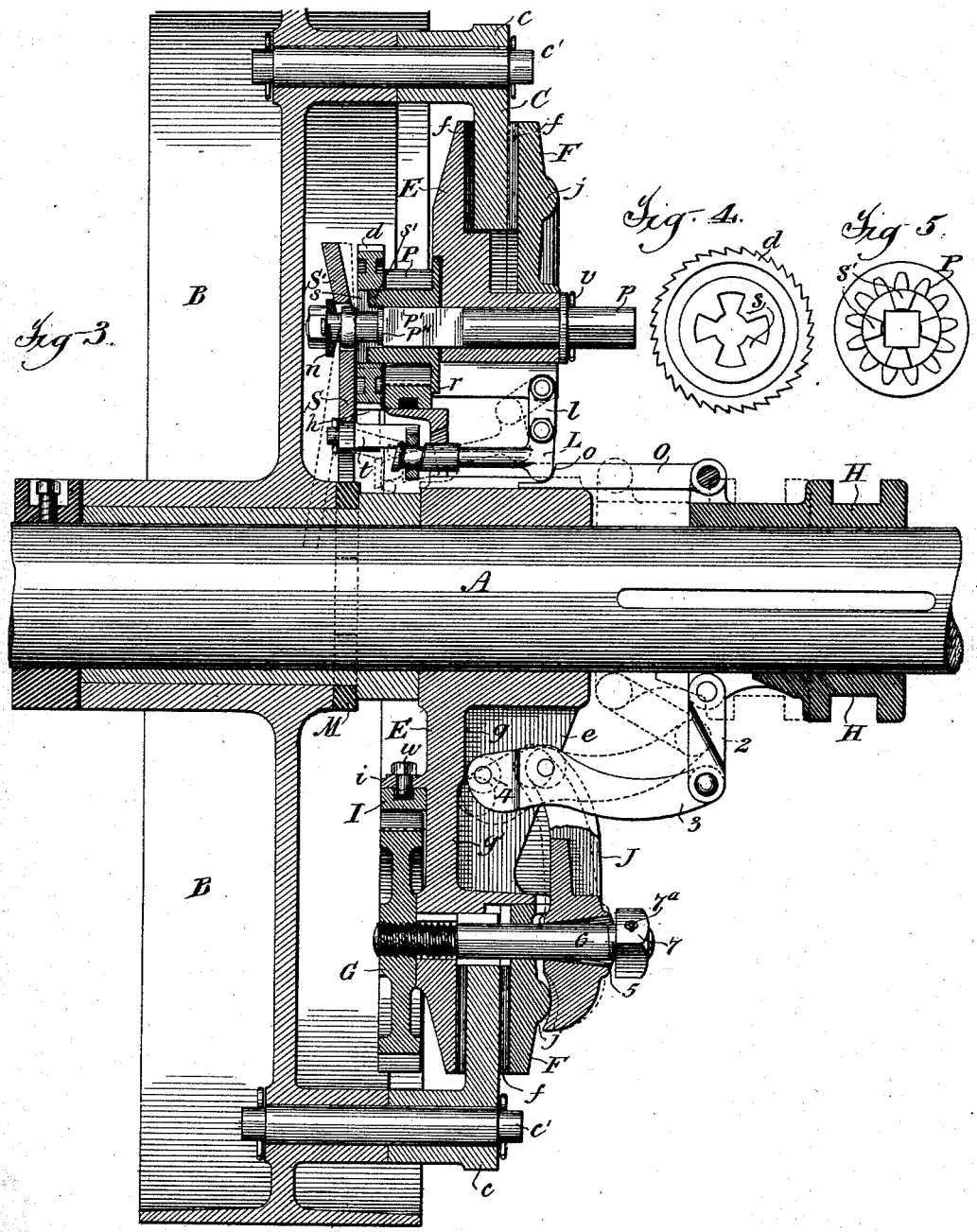
Attest:
Geo H Botts
S. Winthal
Inventor:
Peter Weber
by
Philipp Munson & Phelps
Attys

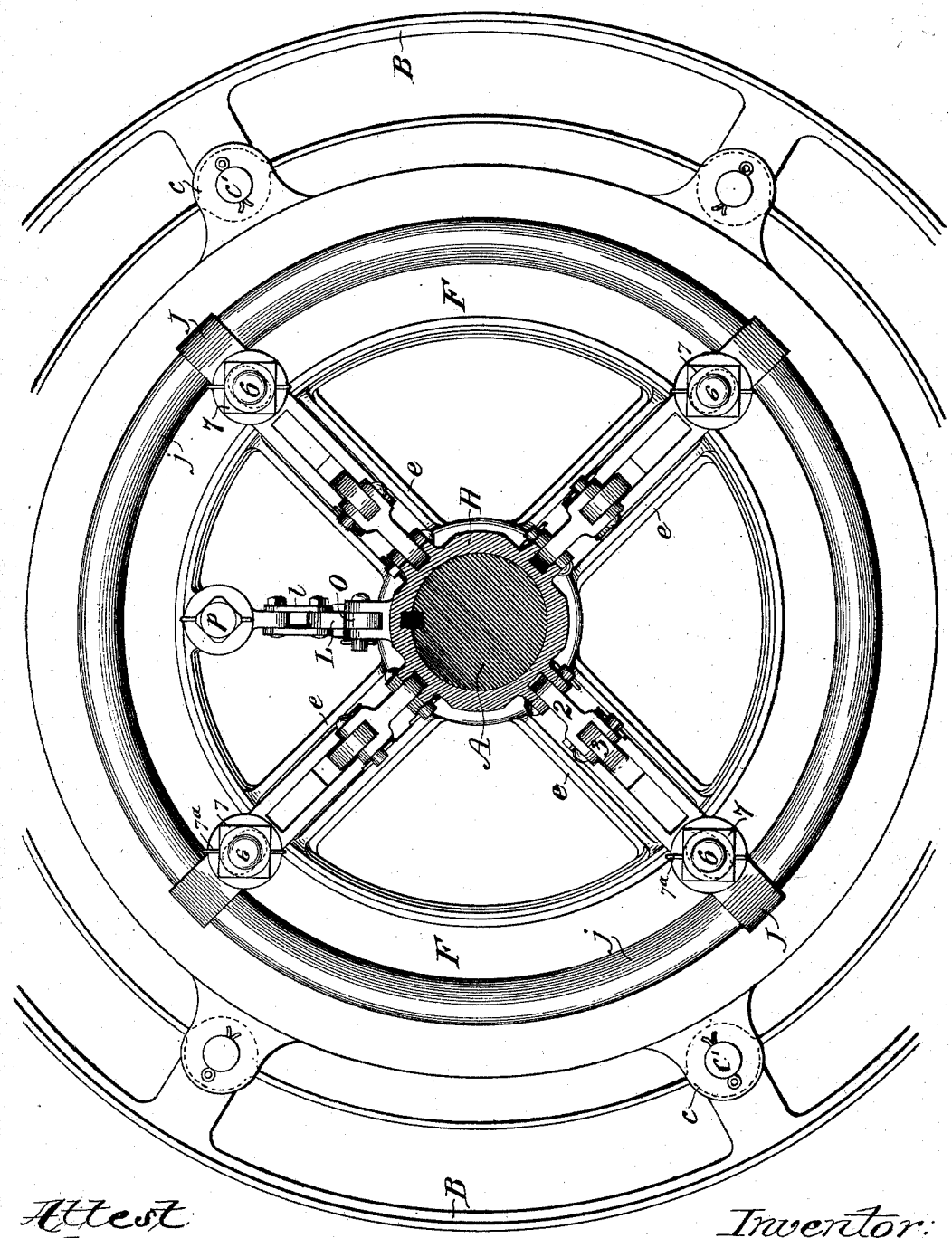

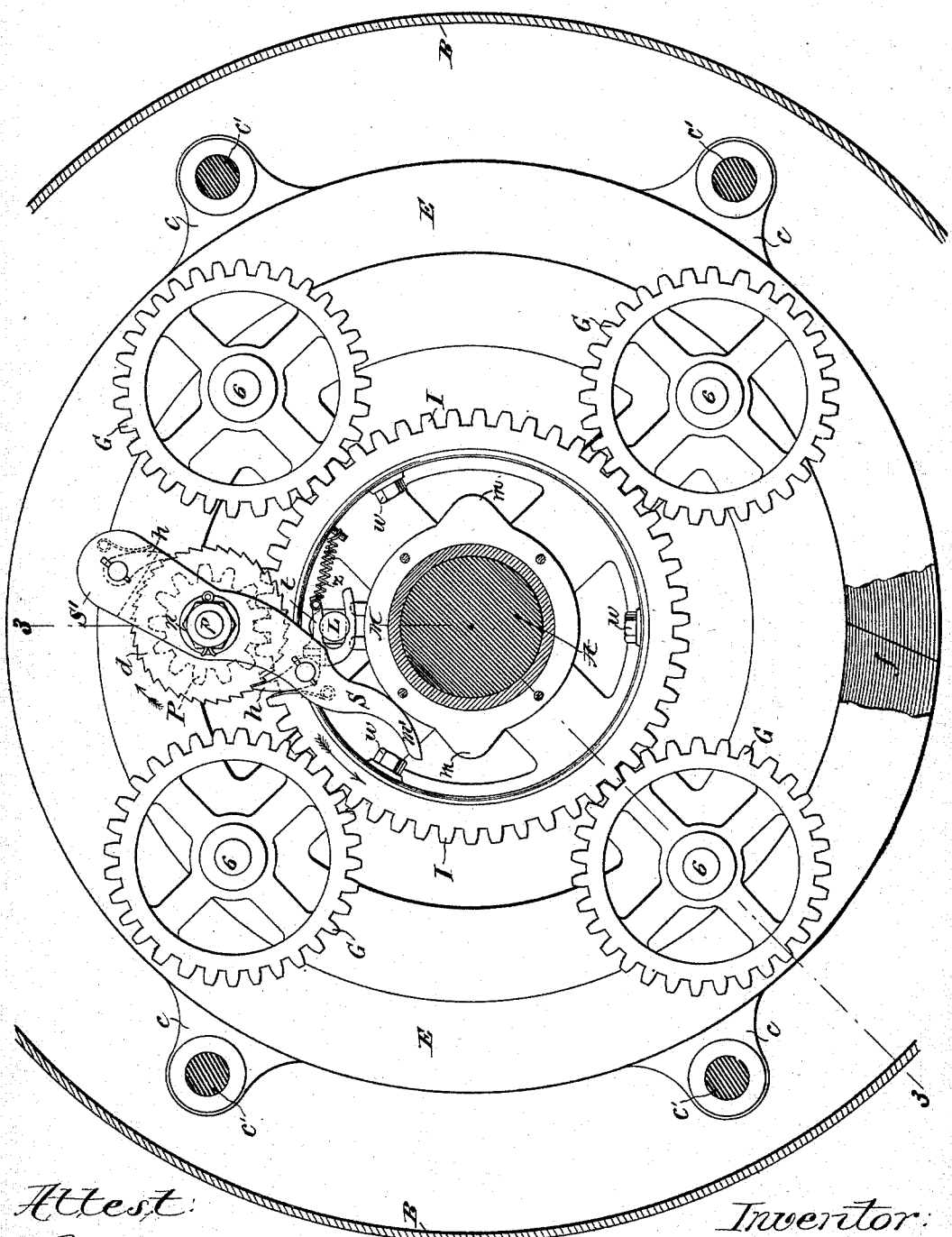

UNITED STATES PATENT OFFICE.

PETER WEBER, OF SCHENECTADY, NEW YORK.

FRICTION-CLUTCH.

SPECIFICATION forming part of Letters Patent No. 483,370, dated September 27, 1892.

Application filed April 8, 1892. Serial No. 428,316. (No model.)

*To all whom it may concern:*

Be it known that I, PETER WEBER, a citizen of the United States, residing at Schenectady, county of Schenectady, and State of New York, have invented certain new and useful Improvements in Friction-Clutches, fully described and represented in the following specification and the accompanying drawings, forming a part of the same.

This invention relates to improvements in that class of clutches commonly called "friction-clutches," in which a mechanism to be driven is connected to a driving mechanism by frictional engagement between the two members of the clutch produced by the movement of one member of the clutch into contact with the other member. In an application filed by me July 22, 1891, Serial No. 400,291, I have shown and described tightening mechanism for such clutches, which mechanism is operated when slip occurs between the two members of the clutch and which when thus operated in turn operates, through connections between it and the clamping mechanism of the clutch, to increase the friction between the contacting or pressing surfaces of the two members of the clutch until a point is reached therein at which the slip ceases, when tightening mechanism will no longer be operated to increase such friction.

The present invention, though as to this feature included broadly within said application, consists, primarily, in certain improvements upon the tightening mechanism of that application. The tightening mechanism illustrated in the main views of that application and specifically claimed therein consists of a lever upon one member adapted to be operated from the periphery of the other member when the latter is rotating a certain direction, said tightening mechanism being inoperative upon the movement of the operating member in the opposite direction. The tightening mechanism of the present invention, however, is adapted to be operated by the operating member of the clutch in either direction of rotation of the latter, and the tightening lever of this mechanism is operated not from the periphery of the operating member, but from some point between the pivoted point of said lever and the axis of said member. The tightening mechanism of the present case is otherwise different from and has other advantages over that just referred to of my prior application, which differences and advantages will appear in the detailed description which will hereinafter be given of this mechanism.

The invention also has for its object the provison of an improved friction-adjusting mechanism, which, acting through the usual clamping mechanism of the clutch or through clamping mechanism specially provided for the purpose, will at a single operation and from a single point simultaneously and uniformly adjust all portions of the pressing-surfaces of the clutch to and from each other to secure desired degrees of friction.

The adjusting mechanism provided by the present invention will be operative not only by hand, but preferably also by the tightening mechanism before referred to, the adjusting mechanism in that case forming part of the connections between the tightening mechanism and the clamping mechanism of the clutch.

The invention also includes improvements upon the devices of my prior application for rendering the tightening mechanism inoperative when the contacting portions of the two members of the clutch are out of or being moved out of clutching position and connections for restoring the tightening mechanism to operative position upon the movement of the clamping mechanism to clamping position, the present invention, however, being included, broadly, in said application.

Other improvements in details of construction and combination of parts as to these mechanisms and other parts of the clutch generally will appear in the detailed description, which will now be given in connection with the accompanying drawings, and will be pointed out in the claims.

In the accompanying drawings the tightening mechanism is shown upon what will be hereinafter referred to as the "driven member" of the clutch and as operated from the driving member, and the adjusting and clamping mechanisms are also shown upon this member. It will be understood, however, that the driving member of these drawings may become the driven and the latter the driving member.

In the drawings, Figure 1 is a front view of the clutch, illustrating particularly the clamping mechanism and a portion of the connections for adjusting the tightening mechanism to and out of operative position. Fig. 2 is a rear view of the clutch, illustrating particularly the adjusting mechanism, the tightening mechanism, and the connections between said tightening mechanism and said adjusting mechanism. Fig. 3 is a section on the irregular line 3 3 of Fig. 2. Figs. 4 and 5 are details, which will be hereinafter referred to.

Referring to said drawings, it will be understood that A represents a shaft to be driven, upon which is loosely mounted a pulley B, driven from any suitable source of power. The shaft A has keyed or otherwise secured to it a disk E, which, as will hereinafter appear, carries the adjusting mechanism, the clamping mechanism, and the slip-operated tightening mechanism of the clutch. The pulley B carries a plate C, which is embraced upon its inner side by the disk E and upon its outer side by a ring F, journaled upon the disk E. (See Fig. 3.) The plate C may be secured to the pulley B in any suitable manner—as, for example, by dovetails, as in my application before referred to; but, as shown and as preferred, the plate C is provided with lugs $c$, extending beyond the periphery of the disk E, through which pass bolts $c'$, which also pass through the pulley B, the bolts $c'$ being held in position by split pins, as shown, or in any other suitable manner. This construction is preferable because of its great simplicity and because of the readiness and ease with which the plate C and other parts of the clutch may be disconnected from the pulley for the purpose of repairing the clutch or to remove and renew the friction-ring interposed between the pressing-surfaces. The contiguous faces of the disk E, plate C, and ring F just described provide the surfaces of the clutch, which make contact with each other to connect pulley B and shaft A, and they have, as just intimated and as shown, interposed between them friction-rings $f$ of wood fiber, &c. The rings $f$ are not connected to disk E, plate C, and ring F, but lie loosely between them, so as to be readily removed and renewed when desired. When the rings $f$ have become worn after constant use, the plate C and the pulley B will be disconnected, so that the latter may be moved away from the clutch, and the disk E, plate C, and ring F moved away from each other by the adjusting mechanism, as hereinafter described, when the rings $f$ may be slit, as shown in Fig. 2, if not already slit, and replaced by new rings similarly slit. The slitting of the rings $f$ and the placing of them loosely between the two members of the clutch do away with the necessity of entirely disconnecting the several parts of the clutch and removing them or some of them from the shaft.

The clamping mechanism of the clutch consists, briefly, of a plurality of toggle-levers 2 3, a lever J for each of said toggle-levers, and a bolt 6 for each lever J, engaging the outer face of the latter and extending inwardly through disk E and at its inner end bearing indirectly against the inner face of disk E, as hereinafter described.

A more detailed description of the construction and operation of the clamping mechanism thus outlined will now be given. Each arm 2 is pivoted at its inner end to a sleeve H, splined to a shaft A and capable of movement to and from disk E for shifting the clamping mechanism to or out of clamping position, and each arm 3 is in turn pivoted at one end to its respective arm 2, and at its other end is provided with a bowl or roller 4, resting agaist the face of the disk E within a pair of ribs $e$, formed in the face of the disk. The disk E is also provided within each pair of ribs with a cam $g$, engaging the bowl or roller 4 of the arm 3 in clamping and with a recess $g'$ at the base of the cam for receiving said bowl or roller in the unclamping position of the clamping mechanism, as in my before-mentioned application. To the arms 3 are pivoted the levers J, before referred to, the outer ends of which rest against a rib $j$, formed in the face of the ring F, as best shown in Fig. 1, and each lever J is provided with an opening 5, through which is passed one of the bolts 6, extending through the disk E. The inner end of said bolt 6 is, as shown in Fig. 3, extended beyond the inner face of the disk E, and has threaded upon it a pinion. G, forming part of the adjusting mechanism of the clutch, as will hereinafter appear. At their outer ends the bolts 6 are provided with nuts 7, held in place upon the bolts by pins $7^a$ and bearing against the outer sides of the levers J in their clamping position, these nuts thus forming the fulcra for said levers when the latter are operated by the toggle mechanism to clamp the pressing-surfaces of the clutch, all substantially as described in my said prior application. The operation of this clamping mechanism will be readily understood from the foregoing and need not be described herein.

In Fig. 3 the clamping mechanism is shown in clamping position in full lines and in its unclamped position in dotted lines.

The adjusting mechanism for adjusting the friction between the two members of the clutch will now be described. This friction-adjusting mechanism consists, briefly, of a plurality of pinions G—one for each bolt 6—and an intermediate I for rotating said pinions. This mechanism will, however, be described more in detail. As best shown in Fig. 3, the inner end of each of the bolts 6 is threaded and carries upon its threaded portion one of the pinions G, which is correspondingly threaded upon its interior. The intermediate I, with which all of the pinions G mesh, is journaled upon a shoulder $i$ upon the disk E, and held to the face of the disk E during rotation by a stud or studs $w$, carried by the shoulder $i$ and entering a circumferential groove upon the inner periphery of the intermediate I. The mechanism for rotating intermediate I consists of a pinion P, having a shaft $p$, which is adapted to be rotated by hand by means of a wrench or by the tightening mechanism which will be hereinafter described. The pinion P, engaging intermediate I, has preferably a squared or polygonal interior fitting over a correspondingly-shaped portion $p'$ of pinion-shaft $p$, which latter is journaled in the disk E and extends through and beyond the outer face of the ring F, in order to adapt the adjusting mechanism to be operated by hand when desired, for which purpose the outer end of shaft $p$ is squared for the reception of a hand-wrench. The pinion P is held to the inner face of disk E by a flange $r$ upon its inner face engaging intermediate I. (See Fig. 3.) Referring particularly to said Fig. 3 it will be seen that the bolts 6 are splined to disk E, so as to be held against rotation upon rotation of their pinions G. The bolts 6 are, however, capable of movement axially of disk E, so that upon the rotation of the pinions G these bolts are moved in and out of the disk E, thereby increasing and decreasing the pressure of the levers J upon the pressing-surfaces of the clutch and correspondingly varying the friction between said surfaces.

The operation of the adjusting mechanism is as follows: As the shaft $p$ and its pinion P are rotated by hand, for example, the pinion P will, through intermediate I, correspondingly rotate the pinions G. As the latter, which are immovable axially of the disk E, are thus rotated, the bolts 6, splined to disk E, are moved in or out through disk E, and thereby lengthened or shortened, so as to decrease or increase the initial friction between the pressing-surfaces upon the movement to clamping position of the levers J. It will be seen from the foregoing that the friction between the pressing-surfaces of the clutch is thus simultaneously and uniformly adjusted at all portions of the pressing-surfaces from a single point and at a single operation, any desired degree of initial friction between these surfaces being thus secured.

The adjusting mechanism just described will, as in my companion application, be supplemented by a tightening mechanism, operated automatically when slip occurs between the two members of the clutch, to operate said adjusting mechanism, and thus increase the friction between the pressing-surfaces. This tightening mechanism in the embodiment illustrated in the drawings consists of a lever and a pawl and ratchet mechanism operated thereby and in turn rotating shaft $p$, the lever and its pawl and ratchet being located upon one member of the clutch and operated from the other member when slip occurs upon its movement in either direction, the lever preferably engaging the operating member between its pivoted point and the axis of said member. More in detail, this mechanism consists of a lever S, carrying a pawl or pawls $h$, engaging a ratchet $d$, provided with jaws $s$, engaging similar jaws $s'$ in the face of the pinion P, the two sets of jaws forming a clutch. The lever S and ratchet $d$ are free to turn upon the shaft $p$ and are held in their proper operative positions upon this shaft with relation to pinion P—that is, with ratchet $d$ and pinion P clutched by a nut $n$ upon the end of the shaft. The lever S is operated by cams or projections $m$ upon a ring M, secured to or integral with the hub of the pulley B, engaging curved portion $m'$ of said lever, the lever S being so formed as to be operated by the cams or projections $m$ upon the movement of pulley B in either direction.

The operation of this tightening mechanism is as follows: So long as no slip occurs between the disk E, plate C, and ring F the tightening mechanism—$i.$ $e.$, lever S and pawl $h$ and ratchet $d$—will not be operated to increase the friction between these surfaces. As soon, however, as such slip occurs and the disk E, carrying lever S, rotates at a less speed than that of the pulley B, or is at rest during the rotation of said pulley, the cam or cams $m$ will as they rotate past the lever S rock the latter and cause its pawl or pawls $h$ to turn ratchet $d$, and through the latter rotate the pinion P, to which it is clutched, in the direction of the arrow, Fig. 2. As the latter is thus rotated, its movement will, as heretofore described, be transmitted through intermediate I to the pinions G, which latter will draw the bolts 6 inwardly through the disk E, and thus increase the pressing of the levers J upon the disk E, plate C, and ring F, and the friction between their pressing-surfaces. This operation of the tightening mechanism will continue so long as slip exists. As soon as slip ceases the lever S, rotating with disk E at the same speed as pulley B, will not be engaged and operated by cams or projections $m$. The friction between the pressing-surfaces, therefore, will be increased by the tightening mechanism only to an extent just sufficient to drive the load upon the shaft, the initial friction between the pressing-surfaces, regulated by the adjusting and clamping mechanisms, determining the point at which said operation shall begin and the weight of the load determining the point at which it shall cease.

It is desirable when the pulley B and the disk E are unclutched, which takes place when the clamping mechanism is moved to its dotted position, Fig. 3, that the lever S should also be moved out of position for engagement and operation by cam or cams $m$. This is accomplished in the present case by means of a latch L, connected by a link $l$ to disk E and projecting through disk E. At its inner end the latch L is grooved transversely, and within this grooved portion receives the slotted or bifurcated end of a rod $t$, connected to the inner end of lever S, the connection between latch L and rod $t$ being such as to permit a slight rocking movement of the former to and from the hub of disk E, as will hereinafter appear. During the inward movement of sleeve H in unclamping the outer end of latch L is engaged by a cam-rod O, connected to sleeve H. As this rod is moved inward, its forward end, engaging the nose of latch L, will force the latter inward through disk E, the nose of the latch as this movement proceeds riding up the cam $o$ at the forward end of rod O into the position on top of said rod, in which it is shown by dotted lines in Fig. 3. As the latch L is thus moved, the inner end of lever S will be moved away from the face of disk E out of the line of rotation of cam or cams $m$, in which position it will remain until the sleeve H is moved outward from the disk E to clamping position. As the sleeve H is thus moved, carrying with it the cam-rod O, the lever S, and with it the rod $t$ and latch L, are restored to the position in which they are shown in full lines in Fig. 3, by a spring $z$, (see Fig. 2,) connected to rod $t$ and disk E, this spring also serving the function of holding the lever S against the hub of pulley B and the bifurcated end of rod $t$ in engagement with latch L. The spring $z$ may, if desired, and in practice it sometimes is, supplemented by an additional spring or springs when it is found that the single spring shown is not of sufficient strength to perform these different functions. To permit of the movement of the inner end of lever S outward from disk E, its outer end S' is inclined outwardly from ratchet $d$, and the nut $n$, holding it upon shaft $p$, is correspondingly inclined upon its inner surface, as shown. This extension S' may, however, be omitted and the lever be of the form shown in my prior application.

When it is intended to adapt the adjusting mechanism to be operated by hand as well as by the tightening mechanism, either for the purpose of adjusting the friction or to loosen the two members of the clutch, so that repairs may be made or the rings $f$ removed or renewed, provision may be made for unclutching ratchet $d$ and pinion P, and preferably without removing either from the shaft $p$. This is accomplished in the present case by adapting the shaft $p$ to be moved inwardly through disk E upon removing cotter-pin $v$, a shoulder $p''$ upon the inner end of shaft $p$ engaging the face of ratchet $d$ and moving it upon this inward movement of the shaft $p$ away from pinion P and taking its jaws $s$ out of engagement with the jaws $s'$ upon the face of pinion P. The squared portion of shaft $p$ is, as shown in Fig. 3, of a length about equal to or slightly exceeding the depth of pinion P and the length of its jaws $s$ to permit of this movement of shaft $p$ through said pinion. When the ratchet has been thus moved, the shaft $p$ and pinion P may be rotated in either direction, according as it is desired to increase or decrease the friction between the pressing-surfaces or to loosen the same for repairs or for the removal or renewal of rings $f$, the ratchet $d$ being loose upon the shaft $p$ and unclutched from pinion P, not being effected by the rotation of the latter. When the friction has been adjusted, the shaft $p$ will be drawn outwardly and cotter-pin $v$ restored, when the tightening mechanism will again be in operative position.

It is to be understood that the term "clamping mechanism" as employed herein in conjunction with the tightening and adjusting mechanism is intended to include not only such a clamping mechanism, as shown, in which a sleeve H or eqivalent mechanism is employed for shifting said clamping mechanism to clamping and unclamping positions, but also any other suitable form of clamping mechanism from which such shifting mechanism is omitted, or any suitable form of clamping mechanism specially provided for operation solely by said tightening mechanism or said adjusting mechanism. It is also to be understood that the term "driving member" includes not only a pulley, as B, but also any driving mechanism, such as a shaft.

It is to be understood that where the tightening mechanism is described as operated when the speed of the driven member is less than that of the driving member it is intended to include the operation of that mechanism when the driven member is in a state of rest. It is also to be understood that the improvements constituting the present invention are not to be limited to the particular class of clutch in connection with which they are illustrated in the drawings and have been described herein.

What I claim is—

1. The combination, with the driving and driven members of a friction-clutch and mechanism for clamping said two members, of tightening mechanism upon one member and operative from the other member in both directions of movement of the driving member of the clutch when the speed of the driven member is less than that of the driving member, and connections engaging said clamping mechanism and operated by said tightening mechanism for operating said clamping mechanism to increase the friction between the two members of the clutch, substantially as described.

2. The combination, with the driving and driven members of a friction-clutch and mechanism for clamping said two members, of tightening mechanism upon one member, one or more cams or projections upon the other member between, the axis thereof and said tightening mechanism, for operating the latter when the speed of the driven member is less than that of the driving member, and connections engaging said clamping mechanism and operated by said tightening mechanism for operating said clamping mechanism to increase the friction between the two members of the clutch, substantially as described.

3. The combination, with the driving and driven members of a friction-clutch and mechanism for clamping said two members, of a lever pivoted to one member, one or more cams or projections upon the other member, between the axis thereof and the pivotal point of said lever, for rocking the latter when the speed of the driven member is less than that of the driving member, and connections engaging said clamping mechanism and operated by said lever for operating said clamping mechanism to increase the friction between the two members of the clutch, substantially as described.

4. The combination, with the driving and driven members of a friction-clutch and mechanism for clamping said two members, of a lever pivoted to one member, one or more cams or projections upon the other member, between the axis thereof and the pivotal point of said lever, for rocking the latter when the speed of the driven member is less than that of the driving member, a spring for retaining said lever in the line of rotation of said cams or projections, and connections engaging said clamping mechanism and operated by said lever for operating said clamping mechanism to increase the friction between the two members of the clutch, substantially as described.

5. The combination, with the driving and driven members of a friction-clutch and mechanism for clamping said two members, of a lever pivoted to one member, one or more cams or projections upon the other member, between the axis thereof and the pivotal point of said lever, for rocking the latter when the speed of the driven member is less than that of the driving member, a spring for retaining said lever in the line of rotation of said cams or projections, mechanism for adjusting said lever out of their line of rotation, and connections engaging said clamping mechanism and operated by said lever for operating said clamping mechanism to increase the friction between the two members of the clutch, substantially as described.

6. The combination, with the driving and driven members of a friction-clutch and mechanism for clamping said two members, of tightening mechanism upon one member, one or more cams or projections upon the hub of the other member for operating said tightening mechanism when the speed of the driven member is less than that of the driving member, and connections engaging said clamping mechanism and operated by said tightening mechanism for operating said clamping mechanism to increase the friction between the two members of the clutch, substantially as described.

7. The combination, with the driving and driven members of a friction-clutch and mechanism for clamping said two members, of a lever upon one member, one or more cams or projections upon the hub of the other member for rocking said lever when the speed of the driven member is less than that of the driving member, and connections engaging said clamping mechanism and operated by said lever for operating said clamping mechanism to increase the friction between the two members of the clutch, substantially as described.

8. The combination, with the driving and driven members of a friction-clutch and mechanism for clamping said two members, of a tightening-lever pivoted to one member, one or more cams or projections upon the hub of the other member for rocking said lever when the speed of the driven member is less than that of the driving member, a spring for retaining said lever in the line of rotation of said cams or projections, and connections engaging said clamping mechanism and operated by said lever for operating said clamping mechanism to increase the friction between the two members of the clutch, substantially as described.

9. The combination, with the driving and driven members of a friction-clutch and mechanism for clamping said two members, of a tightening-lever pivoted to one member, one or more cams or projections upon the hub of the other member for rocking said lever when the speed of the driven member is less than that of the driving member, a spring for retaining said lever in the line of rotation of said cams or projections, mechanism for adjusting it out of their line of rotation, and connections engaging said clamping mechanism and operated by said lever for operating said clamping mechanism to increase the friction between the two members of the clutch, substantially as described.

10. The combination, with the driving and driven members of a friction-clutch and mechanism for clamping said two members, of tightening mechanism upon one member, one or more cams or projections upon the other member, between the axis thereof and said tightening mechanism, for operating said tightening mechanism when the speed of the driven member is less than that of the driving member, mechanism for adjusting said tightening mechanism to and out of the line of rotation of said cams or projections, and connections engaging said clamping mechanism and operated by said tightening mechanism for operating said clamping mechanism to increase the friction between the two members of the clutch, substantially as described.

11. The combination, with the driving and driven members of a friction-clutch and mechanism for clamping said two members, of a lever pivoted to one member, one or more cams or projections upon the other member, between the axis thereof and the pivotal point of said lever, for operating the latter when the speed of the driven member is less than that of the driving member, mechanism for adjusting said lever to and out of the line of rotation of said cams or projections, and connections engaging said clamping mechanism and operated by said tightening-lever for operating said clamping mechanism to increase the friction between the two members of the clutch, substantially as described.

12. The combination, with the clamping mechanism of a friction-clutch, of lever S upon one member, extending inwardly toward the axis of the other member, cam or projection m upon the other member of the clutch, engaging the inwardly-extending end of and operating said lever when the speed of the driven member is less than that of the driving member, and connections engaging said clamping mechanism and operated by said lever, substantially as described.

13. The combination, with the clamping mechanism of a friction-clutch, of lever S upon one member, extending inwardly toward the axis of the other member, cam or projection m upon the hub of the other member of the clutch, engaging the inwardly-extending end of and operating said lever when the speed of the driven member is less than that of the driving member, and connections engaging said clamping mechanism and operated by said lever, substantially as described.

14. The combination, with the clamping mechanism of a friction-clutch, of lever S upon one member, extending inwardly toward the axis of the other member and provided at its inner end with curved portion $m'$, cam or projection m upon the other member of the clutch, engaging said curved portion and operating said lever when the speed of the driven member is less than that of the driving member, and connections engaging said clamping mechanism and operated by said lever, substantially as described.

15. The combination, with the clamping mechanism of a friction-clutch, of lever S upon one member, extending inwardly toward the other member, a spring for holding it to the hub of the other member, cam or projection m upon the latter member, engaging the inner end of and operating said lever when the speed of the driven member is less than that of the driving member, and connections engaging said clamping mechanism and operated by said lever, substantially as described.

16. The combination, with the driving and driven members of a friction-clutch and a plurality of clamping devices for clamping said two members, of a pinion for each of said clamping devices for operating the latter to adjust the friction between the two members of the clutch, tightening mechanism upon one member and operated from the other member when the speed of the driven member is less than that of the driving member, and connections engaging said pinions and operated by said tightening mechanism for rotating said pinions to increase the friction between the two members of the clutch, substantially as described.

17. The combination, with the driving and driven members of a friction-clutch and a plurality of clamping devices for clamping said two members, of a pinion for each of said clamping devices for operating the latter to adjust the friction between the two members of the clutch, gearing connecting all of said pinions, tightening mechanism upon one member and operated from the other member when the speed of the driven member is less than that of the driving member, and connections engaging said gearing and operated by said tightening mechanism for rotating said gearing and pinions to increase the friction between the two members of the clutch, substantially as described.

18. The combination, with the driving and driven members of a friction-clutch and a plurality of clamping devices for clamping said two members, of a pinion for each of said clamping devices for operating the latter to adjust the friction between the two members of the clutch, an intermediate connecting all of said pinions, tightening mechanism upon one member and operated from the other member when the speed of the driven member is less than that of the driving member, and connections engaging said intermediate and operated by said tightening mechanism for rotating said intermediate and pinions to increase the friction between the two members of the clutch, substantially as described.

19. The combination, with the driving and driven members of a friction-clutch and a plurality of clamping devices for clamping said two members, of a pinion for each of said clamping devices for operating the latter to adjust the friction between the two members of the clutch, gearing connecting all of said pinions, a pinion for rotating said gearing, tightening mechanism upon one member and operated from the other member when the speed of the driven member is less than that of the driving member, and connections engaging said pinion and operated by said tightening mechanism for rotating said pinion, and gearing and pinions connected with the latter to increase the friction between the two members of the clutch, substantially as described.

20. The combination, with ratchet d and pinion P and their clutching-faces, of shaft p, journaled in disk E and movable longitudinally in said disk and through pinion P and shoulder $p''$ upon said shaft for unclutching said ratchet and pinion, substantially as described.

21. The combination, with the driving and driven members of a friction-clutch, of clamping-bolts 6, splined to one member, toggle-levers connected to said bolts and engaging the other member, a pinion G for each bolt and threaded thereon, and intermediate I, gearing with and for rotating said pinions, substantially as described.

22. The combination, with the driving and driven members of a friction-clutch, of clamping-bolts 6, splined to one member, toggle-levers connected to said bolts and engaging the other member, a pinion G for each bolt and threaded thereon, and intermediate I, gearing with and for rotating said pinions, and pinion P for rotating said intermediate, substantially as described.

23. The combination, with intermediate I, pinion P, and its shaft $p$, movable longitudinally through said pinion, of flange $r$ upon said pinion, engaging the inner face of said intermediate, substantially as described.

24. In a friction-clutch, the combination of disk E, sleeve H, lever S, mounted on and movable to and from said disk, latch L, linked to disk E and connected to lever S, and rod O, connected to sleeve H and engaging latch L, substantially as described.

25. In a friction-clutch, the combination of disk E, sleeve H, lever S, mounted on and movable to and from said disk, rod $t$, connected to said lever, latch L, linked to disk E and connected to rod $t$, and rod O, connected to sleeve H and engaging latch L, substantially as described.

26. In a friction-clutch, the combination of disk E, sleeve H, lever S, mounted on and movable to and from said disk, rod $t$, connected to said lever, latch L, linked to disk E and connected to rod $t$, spring $z$, connected to said rod and disk E, and rod O, connected to sleeve H and engaging latch L, substantially as described.

27. In a friction-clutch, the combination of disk E, sleeve H, lever S, mounted on and movable to and from said disk, rod $t$, connected to said lever, latch L, linked to disk E and connected to rod $t$, spring $z$, connected to said rod and to disk E, and rod O, connected to sleeve H and provided with cam $o$, engaging latch L, substantially as described.

28. The combination, with pulley B and plate C, detachably connected thereto, of disk E, engaging one side of said plate, ring F, carried by said disk and engaging the opposite side of said plate, and rings $f$, of fibrous material, disconnected from and loose between said plate, disk, and ring, substantially as described.

29. The combination, with pinion P, pawl $h$ and ratchet $d$, means for clutching said pinion and pawl and ratchet, and lever S for operating said pawl and ratchet, of shaft $p$, movable longitudinally through said pinion and provided with polygonal portion $p'$, receiving said pinion, and with shoulder $p''$ for unclutching said pinion and pawl $h$ and ratchet $d$, substantially as described.

30. The combination, with pinion P, pawl $h$ and ratchet $d$, jaws $s$ $s'$ for clutching said pinion and pawl and ratchet, and lever S for operating said pawl and ratchet, of shaft $p$, movable longitudinally through said pinion and provided with polygonal portion $p'$, receiving said pinion, and with shoulder $p''$ for unclutching said pinion and pawl $h$ and ratchet $d$, substantially as described.

In testimony whereof I have hereunto set my hand in the presence of two subscribing witnesses.

PETER WEBER.

Witnesses:
L. O. WEBER,
ALFRED A. LUNDGUN.